No. 711,827. Patented Oct. 21, 1902.
J. COOK & J. M. PUMERVILLE.
ELECTRIC HEATER FOR DENTAL PURPOSES.
(Application filed July 15, 1901.)
(No Model.) 2 Sheets—Sheet 1.
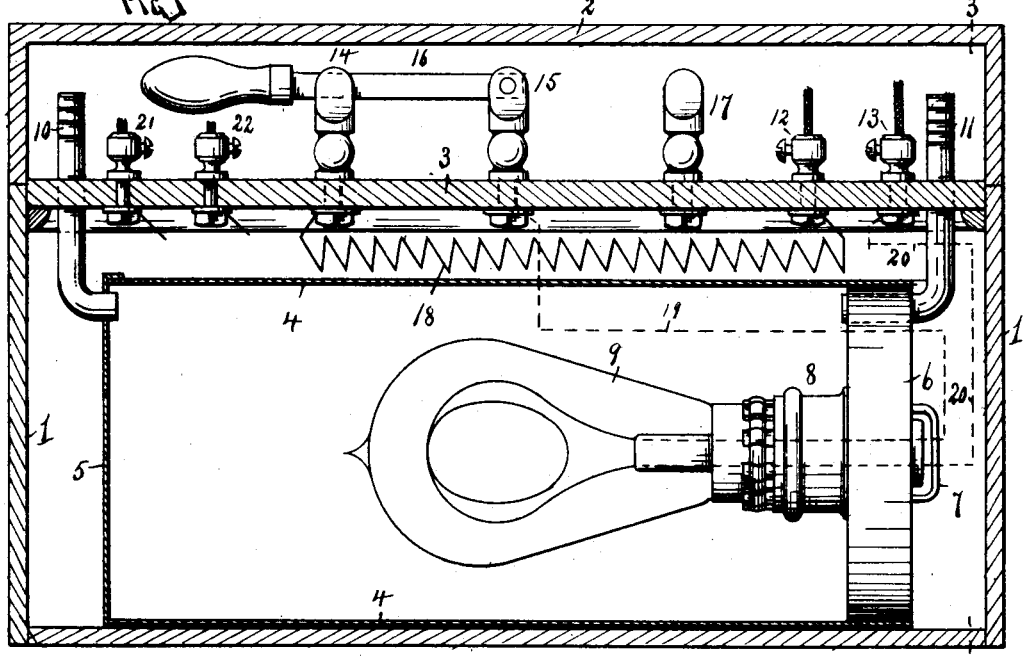
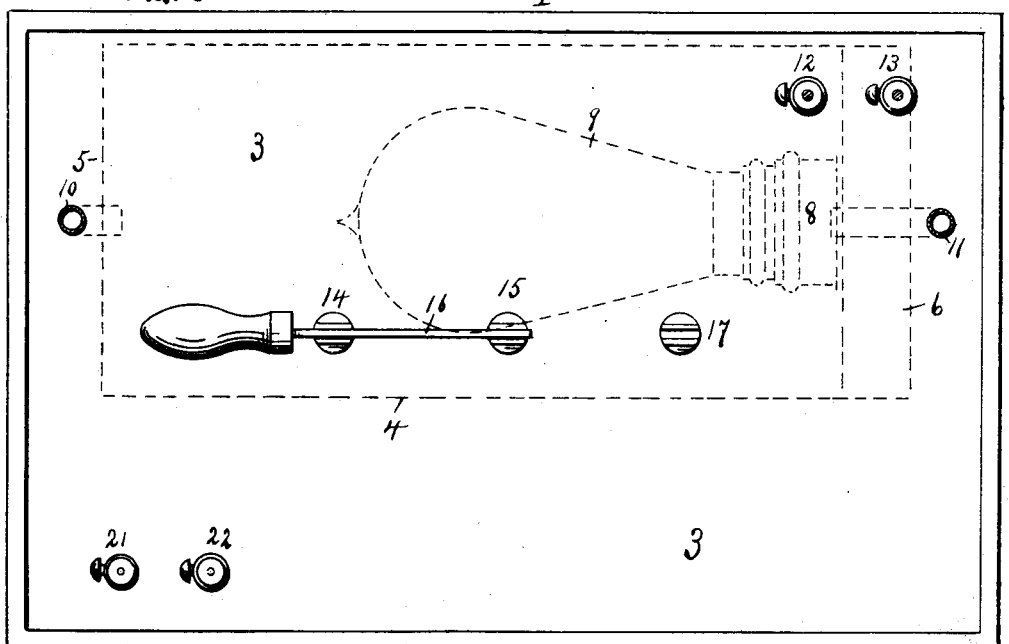
Witnesses
C. H. Woodward
Chas. S. Hyer
Julius Cook
J. M. Pumerville, Inventors
by C. A. Snow & Co.
Attorneys No. 711,827. Patented Oct. 21, 1902.
J. COOK & J. M. PUMERVILLE.
ELECTRIC HEATER FOR DENTAL PURPOSES.
(Application filed July 15, 1901.)

(No Model.) 2 Sheets—Sheet 2.

Witnesses
C. N. Woodward
Chas. S. Hoyer

Julius Cook
J. M. Pumerville, Inventors by C. A. Snow & Co.
Attorneys

UNITED STATES PATENT OFFICE.

JULIUS COOK AND JOSEPH M. PUMERVILLE, OF MICHIGAN CITY, INDIANA.

ELECTRIC HEATER FOR DENTAL PURPOSES.

SPECIFICATION forming part of Letters Patent No. 711,827, dated October 21, 1902.

Application filed July 15, 1901. Serial No. 68,386. (No model.)

*To all whom it may concern:*

Be it known that we, JULIUS COOK and JOSEPH M. PUMERVILLE, citizens of the United States, residing at Michigan City, in the county of Laporte and State of Indiana, have invented a new and useful Electric Heater for Dental Purposes, of which the following is a specification.

This invention relates to an electric heater for dental purposes; and the object of the same is to provide simple and effective means for heating air for use in drying out the cavities of teeth prepared for filling and to heat the air in a manner unknown or unobserved by a patient to avoid startling the timidity of the latter or creating a nervous excitement, and also to use, in conjunction with the heating means, a resistance-wire or analogous device in series therewith in order that electric instruments may be used with the heater, such as pea-lamps and other appliances.

The invention consists in the construction and arrangement of the several parts, which will be more fully hereinafter described and claimed.

Figure 3:
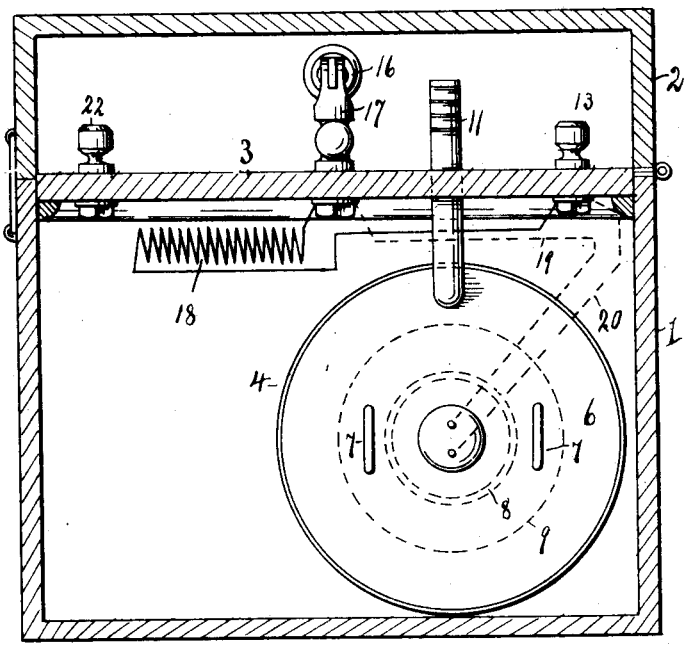
Figure 4:
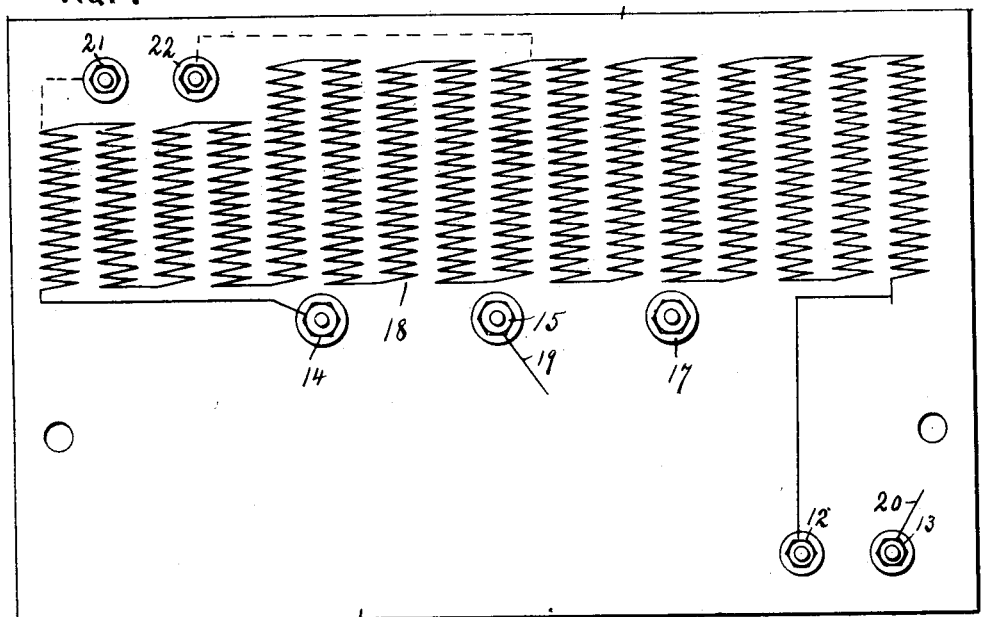

In the drawings, Figure 1 is a longitudinal vertical section of a heater embodying the features of the invention, the resistance-coils of the device being shown in side elevation and in the nature of a diagram in order to avoid confusion. Fig. 2 is a top plan view thereof with the cover removed and showing parts in dotted lines. Fig. 3 is a transverse vertical section on the line 3 3, Fig. 1. Fig. 4 is a bottom plan view of a portion of the heater, particularly showing the arrangement of the resistance-coil.

Similar numerals of reference are employed to indicate corresponding parts in the several views.

The numeral 1 designates a box or casing of suitable dimensions and material and provided with a cover 2, hinged to or otherwise removably applied thereto. Removably mounted in the upper portion of the box or casing is a supporting-plate 3 of suitable non-conducting material and having all the parts of the improved device attached or secured thereto, so that when said plate is removed the heater and its attachments and coacting elements will be simultaneously withdrawn from the casing and, conversely, simultaneously disposed in the casing with the said plate. The parts thus far described are subject to a wide range of modification within the purview of the invention, and it is intended to be understood that this is one simple form of carrying the invention into practical effect.

Connected to the plate 3 and located slightly below the latter is a cylindrical heating-chamber 4, preferably constructed of metal and having one end 5 permanently closed, and a tight-fitting hollow head 6, removably mounted in the opposite end, the said head being provided with gripping devices 7 for convenience in removing and applying the same. In the center of the said head the socket 8 of an incandescent electric lamp 9 is firmly secured, so as to immovably support said lamp, which is projected into the heating-chamber and maintained uniformly in one position in the latter when said head is inserted in the cylinder end, as shown by Fig. 1. The heating-chamber is held in connection with the plate 3 by tubes or pipes 10 and 11, the tube or pipe 10 supplying the chamber with air from a suitable source, either under pressure or in normal condition, and the pipe 11 conveying the heated air from the chamber to the point of use or to an air-injecting instrument, the air entering and flowing from the said chamber being controlled by any suitable devices best adapted for the purpose or the particular use to which the heater is put. In the simplest arrangement of the improved device the lamp 9 may be connected up to binding-posts 12 and 13, having line feeders or wires secured thereto and leading from a suitable source of generation, the connection being made through the posts 14 and 15, having a switch-lever 16, pivoted to one and shiftable into the other, the lever being thrown over to an auxiliary supporting-post 17 when it is desired to shut off the current and cut out the lamp.

To render the improved device more complete and useful for dental purposes, it is preferred to have in connection therewith a coiled resistance-wire 18, of German silver, which is attached at one terminal to the binding-post 12 and at the opposite terminal to the post 14, and from the switch-post 15 a wire 19 runs to one terminal of the lamp 9, the opposite terminal of the latter being connected to the post 13 by a wire 20. This resistance-wire, it will be observed, is in series with the lamp, and the use of the same makes it possible to use other instruments with the heater without interfering with the same in its hot-air-producing operation.

A pea-lamp or other instrument requiring a low voltage is intended to be used with the heater, and for this purpose two binding-posts 21 and 22 are provided for the attachment of the same and to which the resistance-coil is connected.

A very useful and simple apparatus is thus produced for dental operations and work, and air for drying purposes can be easily heated out of the range of vision of a patient and applied to tooth-cavities to dry the latter without in the least exciting the patient, and from the same source other instruments may be operated.

The improved device being of simple form will cost but comparatively little to manufacture, and the head 6 being removable will afford means of easy access to the lamp to replace the latter, if necessary.

Having thus described the invention, what is claimed as new is—

1. A device for electrically heating a continuous current of air, comprising a box or casing, a removable horizontally-disposed plate arranged therein and dividing the box or casing into upper and lower compartments, an air-chamber carried by the plate and provided with air inlet and outlet openings, a cap or cover adapted to form an air-tight closure for the open end of said chamber, an incandescent lamp secured to and removable with said cap or cover, a resistance-coil carried by the plate and having one terminal connected to a terminal of the lamp-filament and its opposite terminal connected to the binding-post of a switch, means for electrically connecting the opposite terminal of the lamp-filament to a second binding-post, and a switch arranged on the upper surface of the plate and adapted to connect said posts to close the circuit.

2. A device for electrically heating a current of air, comprising a box or casing, a removable horizontally-disposed plate dividing the same into lower compartments, an air-chamber carried by said plate and situated within the lower compartment, air inlet and outlet nipples connected to said chamber and having their upper ends extending within the upper compartment, an incandescent lamp located within the air-chamber, a resistance-coil carried by the plate and disposed within the lower compartment, binding-posts and switching devices on the upper surface of the plate and arranged within the upper compartment, and a cover or lid hinged to a box or casing and adapted to cover and inclose said upper compartment, substantially as specified.

In testimony that we claim the foregoing as our own we have hereto affixed our signatures in the presence of two witnesses.

JULIUS COOK.
JOSEPH M. PUMERVILLE.

Witnesses as to J. C.:
　WORTH W. PEPPLE,
　JAMES N. BILLINGS.
Witnesses as to J. M. P.:
　R. T. LACEY,
　CASPER BRAND.